Aug. 23, 1938.  A. CIBULKA  2,128,039

PRESSURE RELIEF VALVE

Filed Aug. 22, 1936

Alois Cibulka Inventor

By W. F. Weigester Attorney

Patented Aug. 23, 1938

2,128,039

UNITED STATES PATENT OFFICE 2,128,039

PRESSURE RELIEF VALVE

Alois Cibulka, Baytown, Tex., assignor to Standard Oil Development Company, a corporation of Delaware Application August 22, 1936, Serial No. 97,397

1 Claim. (Cl. 137—53)

This invention relates to improvements in automatic release devices of the frangible type for containers which may be subjected to excessive pressure. The principal object of the device is to provide a release device in which rupturing of the frangible element will not prevent continued operation of the container under the normal pressure for which it is designed or adjusted. The invention will be fully understood from the following description, read in connection with the accompanying drawing in which Fig. 1 is a vertical section through the device.

Figure 1:
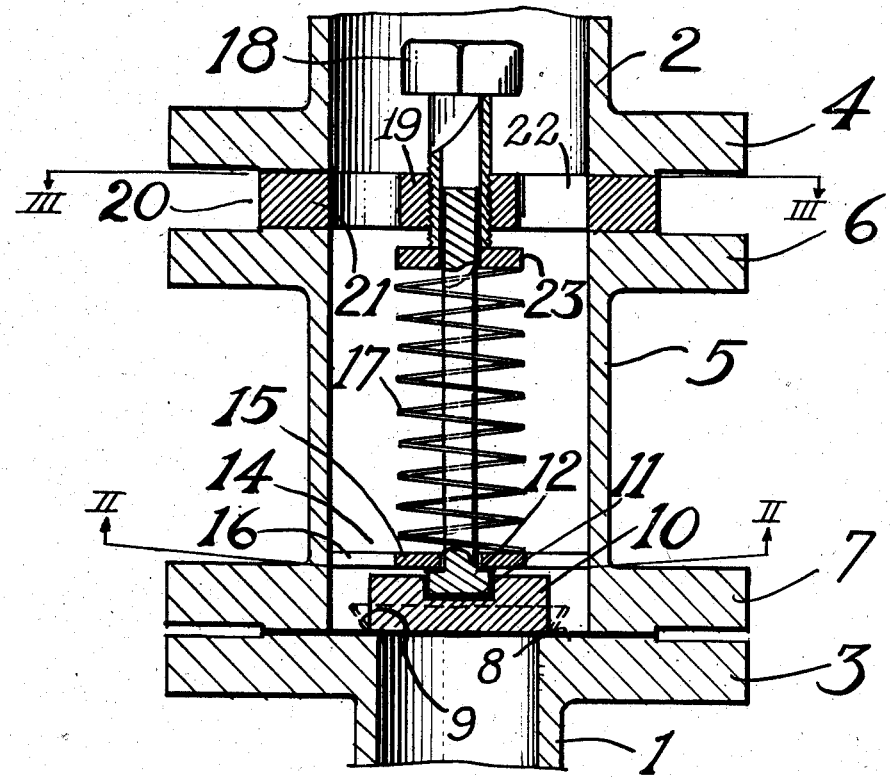
Figure 3:
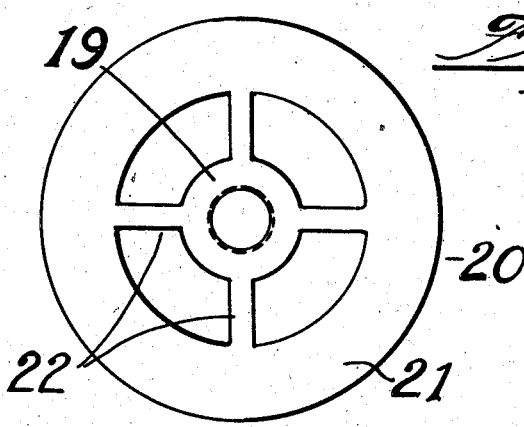
Fig. 3 is a transverse section on the line III—III looking down.
Figure 2:
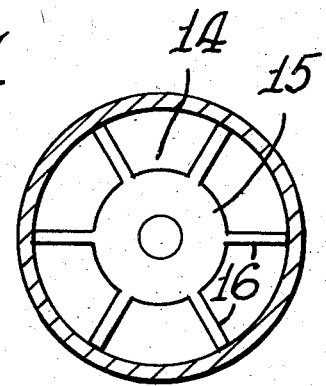
Fig. 2 is a transverse section on the line II—II looking up.

Referring to the drawing numeral 1 denotes the outlet pipe or nozzle of a pressure vessel. Numeral 2 denotes an extension of said nozzle consisting of a pipe having an internal diameter greater than that of the nozzle 1. Flanges 3 and 4 are provided on the respective ends of the pipes 1 and 2. Numeral 5 denotes a valve body preferably formed of a short section of pipe similar to that of the extension 2 and of substantially the same lateral dimensions. The valve body is flanged at both ends as indicated by numerals 6 and 7 and adapted for insertion between the ends of pipes 1 and 2.

The flanges 3 and 7 are adapted to be joined by bolts or other suitable means and by reason of the difference in internal diameter between the nozzle 1 and the valve body 5 an annular shoulder 8 is formed at the junction. In making the joint, a disc 9 or flat sealing member of frangible material, metal or fibrous, and preferably lead or copper or a combination of both, is inserted between the flanges 3 and 7 so as to seal the open end of the nozzle 1 and provide a fluid and vapor tight union between the nozzle and the valve body. The dotted lines indicate the position of the seal within the valve body after the seal has been ruptured and excess pressure released from the vessel.

Disposed above or on the outer face of the sealing member 9 is a valve head 10. This member is of such greater diameter than the nozzle 1 that the shoulder 8 provides a seat therefor with the member 9 interposed. In the outer or upper face of the valve head 10 is a centrally disposed cavity 11 adapted to receive the enlarged end 12 of a valve stem. The walls of the cavity 11 and valve end 12 may be threaded or otherwise provided for rigid engagement with one another, but it is preferred that they be freely associated.

A "floating" valve stem guide 14, having a central hub 15, through which the valve stem extends, and spokes 16 extending radially outwardly into sliding relationship to the wall of the valve body, bears upon the outer surface of the enlarged portion 12 of the valve stem. The hub 15 of the valve guide 14 provides a seat for a valve spring 17 encircling the valve stem.

A guide for the other end of the valve stem is provided by a hollow bolt 18 threaded for engagement with the inner wall of an annular hub 19 on the spider 20. The spider 20 has an annular rim 21 adapted to be rigidly positioned between the flanged ends 6 and 4 of the valve body 5 and the extension pipe 2 respectively. Spokes 22 join the rim 21 to the hub 19. An annular member 23 encircles the valve stem adjacent the outer end thereof and provides a seat for the outer end of the spring 17 and also a bearing member for the bolt 18 which may be turned inwardly or outwardly thru the spider hub 19 in order to vary the degree of pressure exerted by the spring 17 on the valve head 10. The valve stem is free to move in or out of the passageway in the bolt 18 as may be required by the operation of the device.

In operation, a sealing member 9 is used which will have a predetermined resistance to shear. This resistance need not necessarily be great as it is supplemented by the pressure of the valve head 10 as imparted by its weight and by the pressure exerted by the spring 17. Further adjustment of the resistance to pressures exerted against the inner side of the seal may be made by means of the adjusting bolt 18. Ordinarily the strength of the sealing member should be just sufficient to withstand the pressure difference between normal operating pressures and the maximum operating pressure, at which release is deemed necessary. The valve itself will ordinarily be adjusted to compensate for that pressure under which normal operation will take place.

When pressure against the under side of the sealing member exceeds the maximum operating pressure for which the valve has been adjusted, the member will shear circumferentially of the wall of the valve body, the free edge of the sealing member between the valve head and the wall being forced inward to form a cap for the head 10 and form a deflector to prevent direct contact with the valve parts of fluids flowing thru the valve at high velocity. The valve head of course will move upwardly against the tension of the spring 17 until the pressure in the vessel with which the valve is connected has been restored to that under which the vessel is normally operated and to which the valve spring has been adjusted. The valve head will then be forced back into position over the outlet nozzle opening with the sealing member 9 functioning in the manner of a valve gasket to maintain a vapor and fluid tight seal so long as the operations continue at normal pressure. The operation of the vessel may be continued without difficulty until it is convenient to replace the sealing member.

The foregoing description is illustrative only and various changes and alternative arrangements may be made within the scope of the appended claim, in which it is my intention to claim all novelty inherent in the invention as broadly as the prior art permits.

I claim:

In a pressure relief device including a pressure inlet nozzle and an outlet pipe, a valve, comprising a casing having an internal diameter greater than said nozzle; a frangible disc disposed between the adjacent ends of the casing and said nozzle; a valve head and stem within the casing, bearing on the nozzle end through said disc; a spider disposed between said casing and outlet pipe and a hollow bolt, threaded through the hub of said spider, slidably receiving the end of the valve stem; a spider within the casing encircling the valve stem adjacent the head and extending into sliding engagement with the walls of said casing and spring means for loading said valve, mounted between the spider within the casing and the hollow bolt and adjustable by means of said hollow bolt.

ALOIS CIBULKA.